(12) United States Patent
He et al.

(10) Patent No.: US 11,962,231 B2
(45) Date of Patent: Apr. 16, 2024

(54) CONTROL METHOD AND DEVICE OF VOLTAGE CONVERTER AND VOLTAGE CONTROL SYSTEM

(71) Applicant: Jiangsu Contemporary Amperex Technology Limited, Jiangsu (CN)

(72) Inventors: Weichen He, Jiangsu (CN); Jinfeng Gao, Jiangsu (CN); Zhimin Dan, Jiangsu (CN); Yizhen Hou, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 0 days.

(21) Appl. No.: 17/821,811

(22) Filed: Aug. 24, 2022

(65) Prior Publication Data

US 2023/0044189 A1 Feb. 9, 2023

Related U.S. Application Data

(63) Continuation of application No. PCT/CN2021/129511, filed on Nov. 9, 2021.

(30) Foreign Application Priority Data

Dec. 31, 2020 (CN) .......................... 202011620158.0

(51) Int. Cl.
*H02M 1/00* (2006.01)
*H02M 1/32* (2007.01)
*H02M 7/538* (2007.01)

(52) U.S. Cl.
CPC ....... *H02M 1/0025* (2021.05); *H02M 1/0006* (2021.05); *H02M 1/0009* (2021.05); *H02M 1/32* (2013.01); *H02M 7/53803* (2013.01)

(58) Field of Classification Search
CPC ............. H02M 1/0025; H02M 1/0006; H02M 1/0009; H02M 1/32; H02M 7/53803
See application file for complete search history.

(56) References Cited

U.S. PATENT DOCUMENTS 5,838,524 A 11/1998 Phillips
7,622,902 B1 11/2009 Kao et al.
(Continued)

FOREIGN PATENT DOCUMENTS

CN 1815838 A 8/2006
CN 103078485 A 5/2013
(Continued)

OTHER PUBLICATIONS

The extended European search report received in the corresponding European Application 21913488.9, dated Jul. 3, 2023.
(Continued)

*Primary Examiner* — Kyle J Moody
(74) *Attorney, Agent, or Firm* — Kilpatrick Townsend & Stockton LLP (57) ABSTRACT

A control method and device of a voltage converter and a voltage control system are provided. In some embodiments, the control device includes a first control module configured to obtain a current reference value according to an output voltage of a voltage converter and a given voltage value; a current modulation module configured to reduce the current reference value when an output current of a voltage converter is greater than a first current threshold; and a second control module configured to control the output current of a voltage converter according to the reduced current reference value and an output current.

18 Claims, 6 Drawing Sheets

(56) References Cited

U.S. PATENT DOCUMENTS

| | | |
|---|---|---|
| 2003/0178978 A1 | 9/2003 | Biagi et al. |
| 2006/0290333 A1 | 12/2006 | Fukushi et al. |
| 2015/0061757 A1 | 3/2015 | Guo et al. |
| 2015/0188442 A1* | 7/2015 | Kesterson ......... H02M 3/33523 363/21.15 |
| 2020/0127575 A1* | 4/2020 | Liu ..................... G06F 1/266 |
| 2021/0006073 A1* | 1/2021 | Donahue ................ H02J 3/388 |

FOREIGN PATENT DOCUMENTS

| | | |
|---|---|---|
| CN | 103280960 A | 9/2013 |
| CN | 103078298 B | 9/2015 |
| CN | 106385101 A | 2/2017 |
| CN | 108011506 A | 5/2018 |
| CN | 110707657 A | 1/2020 |
| CN | 112290776 A | 1/2021 |
| IN | 107069651 A | 8/2017 |
| JP | 2018107846 A | 7/2018 |
| JP | 2021069242 A | 4/2021 |

OTHER PUBLICATIONS

Decision to Grant a Patent issued in the corresponding Japanese application 2022-534389, dated Jun. 27, 2023.
International Search Report and Written Opinion received in PCT Application PCT/CN2020/129511 dated Dec. 29, 2021.
The first Office Action issued in the Chinese corresponding application 202011620158.0.
The second Office Action issued in the Chinese corresponding application 202011620158.0.
The Office Action received in the corresponding European Application 21913488.9, mailed Jan. 5, 2024.

* cited by examiner

CONTROL METHOD AND DEVICE OF VOLTAGE CONVERTER AND VOLTAGE CONTROL SYSTEM

CROSS-REFERENCE TO RELATED DISCLOSURES

This application is a continuation of International Application PCT/CN2021/129511, filed Nov. 9, 2021, which claims priority to Chinese Application 202011620158.0, filed Dec. 31, 2020, and entitled "CONTROL METHOD AND DEVICE OF VOLTAGE CONVERTER AND VOLTAGE CONTROL SYSTEM", which is incorporated herein by reference in its entity.

TECHNICAL FIELD

This disclosure relates to the technical field of electricity, and in particular, to a control method and device of a voltage converter and a voltage control system.

BACKGROUND

With the development of electricity technology, a voltage converter can be used to convert voltage. For example, it is possible to convert alternating current (AC) voltage to AC voltage, AC voltage to direct current (DC) voltage, or DC voltage to DC voltage.

To achieve precise control of voltage conversion, an output voltage and current of a voltage converter can be used as feedback signals, and such feedback signals can be returned to an input terminal of the control in a certain way, imposing a control influence on the input terminal.

However, due to a long time delay in the whole regulation process, the output current of a voltage converter can't be timely regulated in the existing control solutions.

SUMMARY

The embodiments of this disclosure provide a control method and device of a voltage converter and a voltage control system, which can timely regulate an overcurrent for the output current of the voltage converter.

According to a first aspect, the embodiments of this disclosure provide a control device of a voltage converter, comprising:
 a first control module, which is used to obtain a current reference value according to an output voltage of a voltage converter and a given voltage value;
 a current modulation module, which is used to reduce the current reference value when the absolute value of an output current of a voltage converter is greater than the absolute value of the first current threshold;
 a second control module, which is used to control the output current of a voltage converter according to the reduced current reference value and an output current;

According to a second aspect, the embodiments of this disclosure provide a control method for a voltage converter, comprising:
 obtaining a current reference value according to an output voltage of a voltage converter and a given voltage value;
 reducing the current reference value when the absolute value of an output current of a voltage converter is greater than the absolute value of the first current threshold;
 controlling the output current of a voltage converter according to the reduced current reference value and an output current.

According to a third aspect, the embodiments of this disclosure provide a voltage control system, comprising:
 a control device provided in the first aspect or any optional embodiment of the first aspect; and
 a voltage converter.

When an output current of a voltage converter is overcurrent, that is, the output current collected at an output terminal of the voltage converter is greater than the first threshold current, a control method and device of the voltage converter and a control system in the embodiments of this disclosure can reduce the current reference value, and the reduced current reference value and an output current can be used to control the output current of the voltage converter. In comparison with the existing control solutions of the voltage converter, the current reference value can be timely reduced when an output current of a voltage converter is overcurrent, so as to achieve a timely regulation of the voltage converter when the output current of the voltage converter is overcurrent.

BRIEF DESCRIPTION OF DRAWINGS

To describe the technical solutions in the embodiments of this disclosure more clearly, the following outlines the drawings used in the embodiments of this disclosure. Evidently, the drawings outlined below are merely some embodiments of this disclosure. A person of ordinary skill in the art can derive other drawings from the outlined drawings without making any creative efforts.

DETAILED DESCRIPTION OF EMBODIMENTS

The features of various aspects and the exemplary embodiments herein are described in detail below. To make the purpose, technical solutions and advantages of this disclosure more clearly, this disclosure is further described in detail in combination with the drawings and specific embodiments. Understandably, the specific embodiments described herein are simply intended to describe but not to limit this disclosure. For a person of skill in the art, this disclosure can be implemented without some of these specific details. The description of embodiments below is intended simply to provide a better understanding of this disclosure by showing examples of this disclosure.

Please note that the relational terms herein such as "first" and "second" are simply used only to distinguish an entity or operation from another, and do not necessarily require or imply any such actual relationship or sequence between these entities or operations. Moreover, the term "comprise" and "cover" or any other variants thereof is intended to cover a non-exclusive inclusion, so that such term includes the process, method, item or device of a series of elements, which not only includes those elements, but also includes other elements not clearly listed, or further includes the inherent elements of such process, method, item or device. To the extent without further restriction, the elements defined by the statement "comprise . . . " do not exclude other identical elements existing in the process, method, item or device of the included element.

At present, when a voltage conversion is required, a voltage converter can be used to achieve the voltage conversion. To improve the accuracy of an output voltage and an output current, a closed-loop mechanism can be used to modulate the output voltage and the output current. For example, the dual closed-loop strategy of voltage outer loop and current inner loop can be adopted, that is, a control relation that an output voltage and an output current are used as feedback signals to be returned to an input terminal, imposing a control influence on the input terminal.

However, in the existing dual closed-loop control strategy, when there is a leap in the output voltage of the outer loop, the rapid response of the current in the inner loop may cause a large overshoot, and the resultant transient current may cause an overcurrent to the output current.

For example, in the battery field, under an energy transmission of vehicle to everything (V2X) scenario, an overshoot of an output current may greatly impact the operational performance of a device connected to the output terminal of a voltage converter.

To understand this disclosure better, the concepts of voltage converter, battery, and V2X scenario are successively described in detail in the embodiments of this disclosure.

(1) Voltage converter.

In the embodiments, a voltage converter may comprise a direct current-direct current (DCDC) conversion module for conversion between DC voltages, alternatively, it may comprise an alternating current-alternating current (ACAC) conversion module for conversion between AC voltages, or it may further comprise a direct current-alternating current (DCAC) conversion module.

In the embodiments, in V2X mode, the DCAC bi-directional conversion module can be adopted for a voltage converter.

(2) Battery.

The battery in various embodiments can be a lithium-ion battery, a lithium-metal battery, a lead-acid battery, a nickel-cadmium battery, a nickel-hydrogen battery, a lithium-sulfur battery, a lithium-air battery, or a sodium ion battery, which is not defined herein. In terms of size, the battery unit to be tested can either be a cell, a battery module, or a battery pack, which is not defined herein. In terms of disclosure scenarios, the battery can be applied to power devices such as vehicles and ships. For example, the battery can be applied in an electric vehicle and supply power to the electric motor as a power source of the electric vehicle. The battery can further power other electric components in the electric vehicle, such as the vehicle-carrying air conditioner and player.

(3) V2X scenario.

The disclosure scenario of a battery installed in an electric vehicle can be called a V2X scenario. In some embodiments, the V2X scenario may comprise an energy transmission scenario of grid to vehicle (G2V), an energy transmission scenario of vehicle to grid (V2G), and an energy transmission scenario of vehicle to load (V2L).

In a G2V mode, a grid can be called an input terminal, and a battery can be called an output terminal. In the G2V mode, the battery can be charged by the electricity from the grid.

Under a V2G scenario, a battery can be called an input terminal, and a grid can be called an output terminal. In a V2G mode, an electric vehicle can reversely discharge to a grid through a voltage converter. For example, when an electric vehicle is not operating, it can be connected to a grid via a voltage converter to sell the idle electricity of a battery to the grid.

In a V2L mode, a battery is called an input terminal, and a load on the AC side can be called an output terminal. In a V2L mode, the electric energy of a battery can be used to supply power for a load on the AC side.

After describing the above concepts, to solve the related technical issues, the embodiments of this disclosure provide a control method and device of a voltage converter and a voltage control system.

For convenience of understanding, the following part of the embodiments of this disclosure may, in combination with the drawings, describe the voltage control system under the embodiments of this disclosure first.

Figure 1:
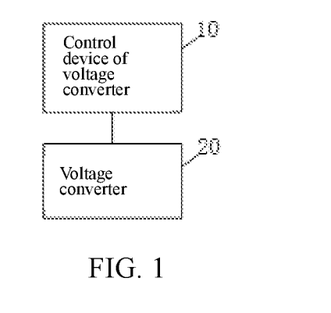
FIG. 1 is a system architecture diagram for a voltage control system provided in the embodiments of this disclosure.

FIG. 1 is a system architecture diagram for a voltage control system provided in the embodiments of this disclosure. As shown in FIG. 1, the voltage control system may comprise a control device 10 and a voltage converter 20.

The voltage converter 20 can be used in voltage conversion.

During a voltage conversion of the voltage converter 20, when the absolute value of an output current of the voltage converter is greater than the absolute value of the first current threshold, the control device 10 of the voltage converter is used to reduce the current reference value, and to control the output current of the voltage converter 20 according to the reduced current reference value.

When an output current of a voltage converter is overcurrent, that is, the absolute value of the output current collected at the output terminal of the voltage converter is greater than the absolute value of the first current threshold, a voltage control system of the embodiment of this disclosure can reduce the current reference value, and the reduced current reference value and an output current are used to control the output current of the voltage converter. In comparison with the existing control solutions of the voltage converter, the current reference value can be timely reduced when an output current of a voltage converter is overcurrent, so as to achieve a timely regulation of the voltage converter when the output current of the voltage converter is overcurrent.

In some embodiments, the voltage control system provided in the embodiments of this disclosure can be applied in an electric vehicle scenario.

Figure 2:
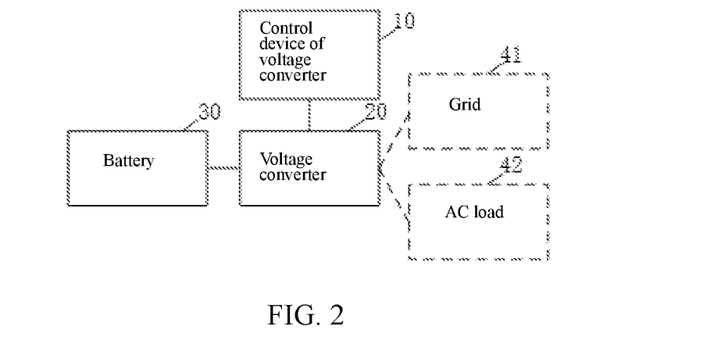
FIG. 2 is a system architecture diagram for another voltage control system provided in the embodiments of this disclosure.

Accordingly, FIG. 2 is a system architecture diagram of another voltage control system provided in the embodiments of this disclosure. As shown in FIG. 2, one end of the voltage converter 20 is connected to one end of a battery 30, and the other end of the voltage converter 20 is connected to a grid 41 or an AC load 42. To facilitate the intuitive differentiation, the optional connection relations are shown with dashed lines in FIG. 2.

In some embodiments, the voltage control system may further comprise a voltage collection module for collecting an output voltage, and a current collection module for collecting an output current.

After the description of the voltage control system, a control device for the voltage converter provided in the embodiments of this disclosure is described below.

Figure 3:
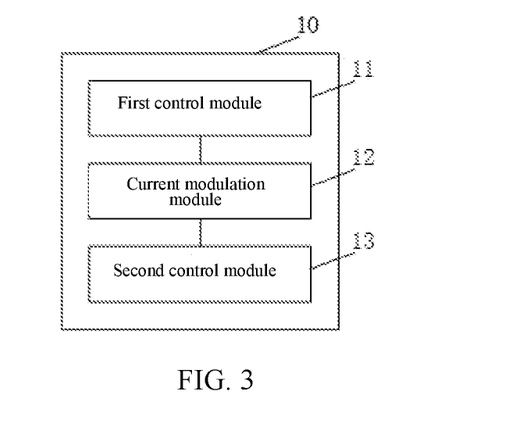
FIG. 3 is a structural schematic diagram for a control device of a first voltage converter provided in the embodiments of this disclosure.

FIG. 3 is a structural schematic diagram for a control device of a first voltage converter provided in the embodiments of this disclosure. As shown in FIG. 3, the control device 10 for a voltage converter comprises a first control module 11, a current modulation module 12 and a second control module 13.

The first control module 11 is used to obtain a current reference value according to an output voltage of the voltage converter 20 and a given voltage value.

The given voltage value can be set based on actual scenarios and actual requirements. Exemplarily, in a V2G mode or a V2L mode, the given voltage value can be the minimum discharging voltage of the battery 30. Further exemplarily, in a G2V mode, the given voltage value can be the nominal charging voltage of the battery 30.

In some embodiments, the difference value between an output voltage of a voltage converter and a given voltage value can be calculated by a subtracter first, and then a current reference value can be obtained by a proportional integral (PI) controller.

The current modulation module 12 is used to reduce the current reference value when the absolute value of an output current of the voltage converter 20 is greater than the absolute value of the first current threshold.

In some embodiments, the first current threshold can be determined from a normal output current, for example, the first current threshold can be a normal output current with preset multiples, the preset multiple is greater than 1.

In other embodiments, the first current threshold can represent the threshold value between overcurrent and non-overcurrent. That is, when an output current exceeds the first current threshold, the output current is overcurrent.

In some embodiments, a comparator can be used to determine whether the absolute value of an output current of the voltage converter 20 is greater than the absolute value of the first current threshold.

In some embodiments, the current reference value can be reduced by a subtracter.

The second control module 13 is used to control an output current of a voltage converter according to the reduced current reference value and an output current.

When an output current of a voltage converter is overcurrent, that is, the absolute value of the output current collected at the output terminal of the voltage converter is greater than the absolute value of the first current threshold, a control device of the voltage converter in the embodiments of this disclosure can reduce the current reference value, and the reduced current reference value and an output current can be used to control the output current of the voltage converter. In comparison with the existing control solutions of the voltage converter, the current reference value can be timely reduced when an output current of a voltage converter is overcurrent, so as to achieve the timely regulation of the voltage converter when the output current of the voltage converter is overcurrent.

Figure 4:
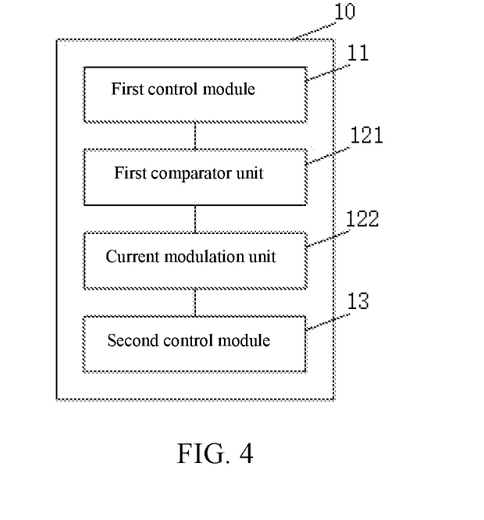
FIG. 4 is a structural schematic diagram for a control device of a second voltage converter provided in the embodiments of this disclosure.

In some embodiments, FIG. 4 is a structural schematic diagram for a control device of a second voltage converter provided in the embodiments of this disclosure. The difference between FIG. 4 and FIG. 3 is that the current modulation module 12 of FIG. 4 comprises a first comparator unit 121 and a current modulation unit 122.

The first comparator unit 121 is used to obtain an output current and the first current threshold and to output a first signal when the absolute value of the output current is greater than the absolute value of the first current threshold.

When the first comparator unit 121 outputs a first signal, it means that the output current of a voltage converter is overcurrent.

In an example, a first signal can be a low-level signal when an output current is provided to the non-inverting input terminal of the first comparator unit 121 and the first current threshold is provided to the inverting input terminal of the first comparator unit 121. That is, the first comparator unit 121 outputs a low-level signal when the output current is greater than the first current threshold. In a specific example, the first current threshold can be provided by a relevant register, and the user can regulate the first current threshold in the relevant register by software. Exemplarily, the first current threshold can be set by means of a DA converter that converts digital quantity into analog quantity.

In an embodiment, a first comparator unit comprises a first comparator subsystem (CMPSS).

Please note that, in a related technology applying a control strategy of pure software, the following process is required to achieve the overcurrent protection function: multiple current data of circuit to be protected in the preset time period is collected (for characterization of the parameters of actual components in the circuit to be protected) first, then the effective current is screened for multiple current data; and according to the result of screening, the target overcurrent protection value corresponding to the circuit to be protected is determined, which shows that when achieving overcurrent protection through software, the sampling and filtering are required, and the current response time delay is relatively long. Because a short current response time delay is required by the hardware characteristics of a voltage converter switch such as a metal-oxide-semiconductor field-effect transistor (MOSFET), the implementation solutions of pure software are risky.

In another related technology of pure hardware control strategy, the achievements of current-limiting protection function for overcurrent through pure hardware solutions require at least the following devices/units: sampling unit, filtering unit, operation and processing unit, comparator action unit, which cost higher.

In this embodiment, as CMPSS is a component module of digital signal processing (DSP) chip, CMPSS has its own analog circuit function, which can reduce the current response time delay and improve the safety of the voltage converter. Moreover, in comparison with pure hardware solutions, the cost can be reduced.

In addition, CMPSS has a high side comparator unit (COMPH), which can compare the positive current with the first current threshold value, and CMPSS further has a low side comparator unit (COMPL), which can compare the negative current with the first current threshold value. Thus, under the disclosure scenario of an electric vehicle, such as in V2G mode and in G2V mode, CMPSS can be used to compare an output current with the first current threshold even though the current flow direction is opposite. Exemplarily, in a COMPH unit, the first current threshold can be positive, such as 55 amperes (A), and in a COMPL unit, the first current threshold can be negative, such as −55 A. Specifically, after the first current threshold is generated in a relevant register, a positive value of the first current threshold and a negative value of the first current threshold can be obtained through a DA converter.

The current modulation unit 122 is used to respond to the first signal and reduce the current reference value.

In this embodiment, in a dual-loop control strategy, when a current overshoot occurs, the current reference value of the current inner loop can be timely regulated through current signal feedback by the first comparator unit 121, without modifying the control parameters of the PI loop, and the overshoot of the PI loop can be avoided to the great extent while ensuring the dynamic response speed of the PI loop.

Figure 5:
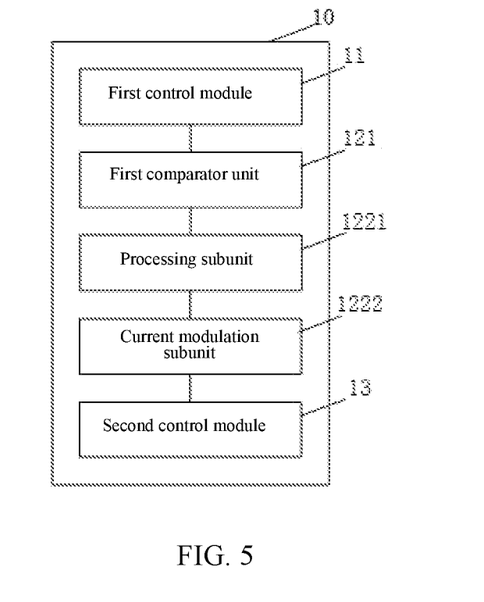
FIG. 5 is a structural schematic diagram for a control device of a third voltage converter provided in the embodiments of this disclosure.

In an embodiment, FIG. 5 is a structural schematic diagram for a control device of a third voltage converter provided in the embodiments of this disclosure. The difference between FIG. 5 and FIG. 4 is that the current modulation unit 122 of FIG. 5 comprises a processing subunit 1221 and a current modulation subunit 1222.

The processing subunit 1221 is used to determine a current down-regulation value in response to a first signal. In some embodiments, the current down-regulation value can be a fixed value. Exemplarily, as long as a low-level signal transmitted by the first comparator unit 121 is received, a current down-regulation value is generated.

The current modulation subunit 1222 is used to obtain a reduced current reference value after reducing the current down-regulation value from the current reference value. The reduced current reference value can be equal to the difference value between the current reference value before the reduction and the current down-regulation value.

Exemplarily, the current modulation subunit 1222 can be concretely implemented as a subtracter. Specifically, a reduced current reference value can be output after the current reference value and a current down-regulation value are inputted to the subtracter.

Figure 6:
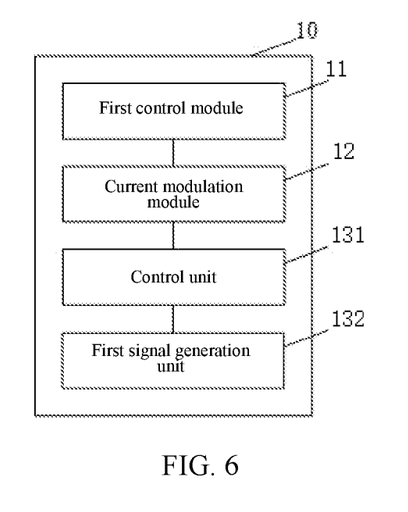
FIG. 6 is a structural schematic diagram for a control device of a fourth voltage converter provided in the embodiments of this disclosure.

In some embodiments, FIG. 6 is a structural schematic diagram for a control device of a fourth voltage converter provided in the embodiments of this disclosure. The difference between FIG. 6 and FIG. 3 is that the second control module 13 of FIG. 6 comprises a control unit 131 and a first signal generation unit 132.

The control unit 131 is used to generate a regulation value of an output current according to the reduced current reference value and an output current.

In some embodiments, the control unit 131 can be concretely implemented as a subtracter and a PI controller. Specifically, after the current reference value and an output current are inputted into the PI controller, the difference value between them can be obtained, and then a regulation value of the output current can be obtained through the PI controller.

The first signal generation unit 132 is used to generate a control signal of a voltage converter according to the regulation value of an output current.

In an embodiment, the first signal generation unit 132 comprises a first enhanced pulse width modulator (ePWM) unit. Specifically, the cycle and the duty ratio of a control signal can be generated by ePWM.

In an embodiment, an ePWM unit and a CMPSS are the component units of the same DSP chip. With proper configuration, a single DSP chip can be used to control a voltage converter, thus reducing the cost of the hardware circuit. Exemplarily, the model of the DSP chip can be DSP28337D.

In some embodiments, the control unit 131 comprises a difference value determination subunit and a regulation value determination subunit.

The difference value determination subunit is used to determine the difference value between the reduced current reference value and an output current.

In an embodiment, the difference value determination subunit can be concretely implemented as a subtracter.

The regulation value determination subunit is used to determine a regulation value according to the difference value.

In a specific example, the regulation value determination subunit can be concretely implemented as a PI controller.

Please note that the difference value determination subunit and the regulation value determination subunit can be referred to in the relevant description of the control unit 131, which is not repeated here.

Figure 7:
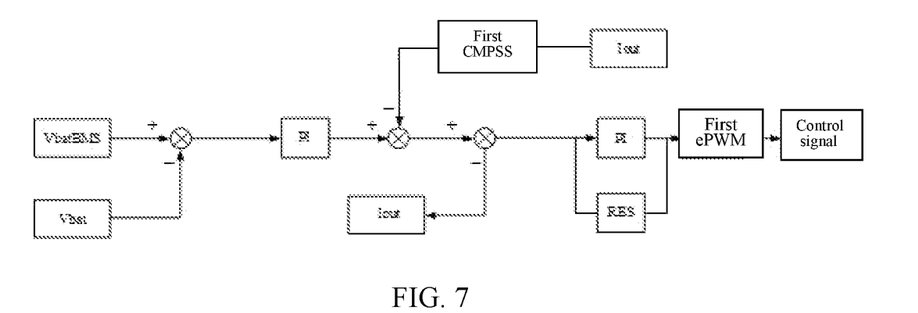
FIG. 7 is a schematic diagram of an exemplary control logic for a control device of a voltage converter provided in the embodiments of this disclosure.

For the convenience of understanding, FIG. 7 is a schematic diagram of an exemplary control logic for a control device of a voltage converter provided in the embodiments of this disclosure.

As shown in FIG. 7, a voltage difference value is obtained after the subtraction between an output voltage Vbat of the voltage converter 20 and the given voltage VbatBMS. The voltage difference value is subject to PI operation to obtain a current reference value.

The first CMPSS obtains an output current Iout and outputs a first signal when the absolute value of the output current Iout is greater than the absolute value of the first current threshold.

After subtraction between the current reference value and a first signal, the reduced current reference value is obtained. Then the reduced current reference value and an output current Iout are subtracted to obtain the difference value between them. Next, such difference value is subject to PI operation to obtain a regulation value of the output current. In an exemplary embodiment, the PI operation can be implemented by a proportional-integral-resonance (PI-RES) controller.

Eventually, the regulation value of an output current is input into the first ePWM unit to obtain a control signal of the voltage converter 20.

Figure 8:
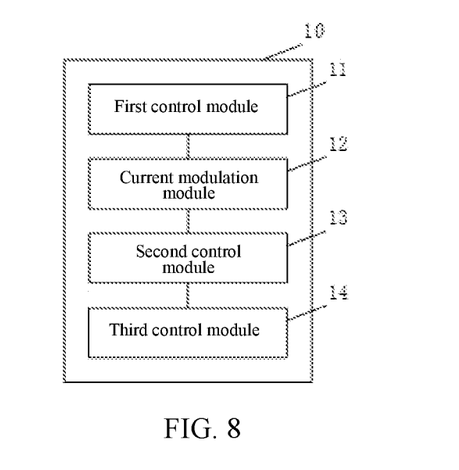
FIG. 8 is a structural schematic diagram for a control device of a fifth voltage converter provided in the embodiments of this disclosure.

In some embodiments, to further prevent the output current overshoot caused by the dual closed-loop control strategy, FIG. 8 is a structural schematic diagram for a control device of a fifth voltage converter provided in the embodiments of this disclosure. The difference between FIG. 8 and FIG. 3 is that the control device 10 of the voltage converter further in FIG. 8 comprises a third control module 14.

The third control module 14 is used to control a voltage converter to stop outputting the current when the absolute value of an output current is greater than the absolute value of the second current threshold.

The absolute value of the second current threshold is greater than the absolute value of the first current threshold.

The details of the second current threshold can be referred to in the description of the first current threshold, which is not repeated here.

Exemplarily, when the first current threshold is 55 A, then the second current threshold can be 60 A. Please note that the first and second current thresholds can be set based on actual scenarios and specific requirements, for example, the second current threshold can be set to a preset multiple of the first current threshold, and the preset multiple is greater than 1. A severe overshoot may occur when the absolute value of an output current is greater than the absolute value of the second current threshold, for example, the second current threshold can be set according to the maximum allowable current of a voltage converter.

Figure 9:
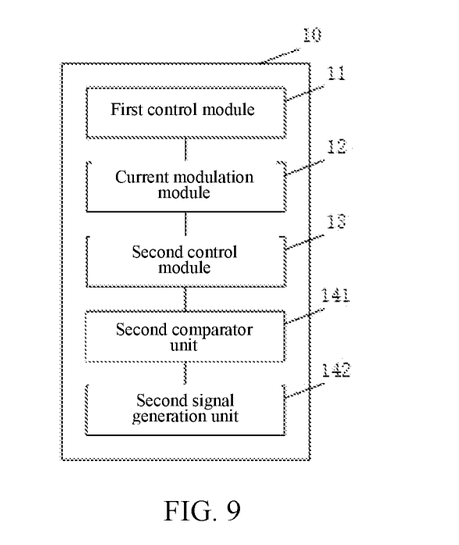
FIG. 9 is a structural schematic diagram for a control device of a sixth voltage converter provided in the embodiments of this disclosure.

In an embodiment, FIG. 9 is a structural schematic diagram for a control device of a sixth voltage converter provided in the embodiments of this disclosure. The difference between FIG. 9 and FIG. 8 is that the third control module 14 of FIG. 9 comprises a second comparator unit 141 and a second signal generation unit 142.

The second comparator unit 141 is used to obtain an output current and the second current threshold, as well as to output a control instruction when the absolute value of the output current is greater than the absolute value of the second current threshold.

The control instruction is used to control a voltage converter to stop outputting the current. Exemplarily, all switching units of the voltage converter 20 can be disconnected to stop outputting the current.

In an example, the second comparator unit 141 comprises a second CMPSS. Please note that the second CMPSS and the first CMPSS can be two different CMPSS.

The details of the second CMPSS can be referred to the relevant description of the first CMPSS, which is not repeated here. Exemplarily, in a COMPH unit of the second CMPSS, the second current threshold can be a positive value, such as 60 A, and in a COMPL unit of the second CMPSS, the second current threshold can be a negative value, such as −60 A.

The second signal generation unit 142 is further used to generate a control signal for the voltage converter 20 in response to a control instruction. The control signal is used to control the converter to stop operating.

In an example, the second signal generation unit 142 comprises an event trip subunit, which modulates a control signal into a low-level signal in response to a control instruction. At this point, a mandatory event is tripped through the event trip subunit, and the control signal of the voltage converter 20 is mandatorily modulated into a low-level signal.

Exemplarily, the second signal generation unit comprises a second ePWM unit. Accordingly, an event trip subunit can be a trip submodule in the second ePWM unit, and the trip submodule can trip a mandatory event in the second ePWM unit.

Figure 10:
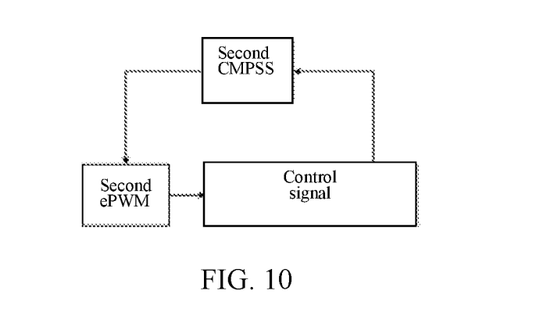
FIG. 10 is a schematic diagram of another exemplary control logic for a control device of a voltage converter provided in the embodiments of this disclosure.

For the convenience of understanding, FIG. 10 is a schematic diagram of another exemplary control logic for a control device of a voltage converter provided in the embodiments of this disclosure.

As shown in FIG. 10, after the second CMPSS obtains an output current Iout, when the absolute value of the output current Iout is determined to be greater than the absolute value of the second current threshold, the second CMPSS may output a control instruction to the second ePWM unit. The ePWM unit may trip a mandatory event in response to such control instruction, and the control signal is mandatorily modulated into a low-level signal, controlling the output current Iout to be equal to zero.

Based on the same disclosure idea, in addition to a control device for a voltage converter, the embodiments of this disclosure further provide a control method for the voltage converter accordingly.

The control method for a voltage converter provided in the embodiments of this disclosure is described in detail below in combination with the drawings.

Figure 11:
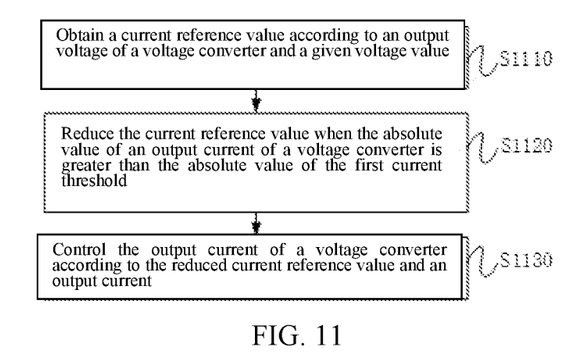
FIG. 11 is a flow schematic diagram for a control method of a voltage converter provided in the embodiments of this disclosure.

FIG. 11 is a flow diagram for a control method of a voltage converter provided in the embodiments of this disclosure. As shown in FIG. 11, the control method for a voltage converter comprises S1110, S1120, and S1130.

S1110, obtaining a current reference value according to an output voltage of a voltage converter and a given voltage value.

S1120, reducing the current reference value when the absolute value of an output current of a voltage converter is greater than the absolute value of the first current threshold.

S1130, controlling the output current of a voltage converter according to the reduced current reference value and an output current.

When an output current of a voltage converter is overcurrent, that is, the absolute value of the output current collected at an output terminal of the voltage converter is greater than the absolute value of the first current threshold, a control method for the voltage converter in the embodiments of this disclosure can reduce the current reference value, and the reduced current reference value and an output current can be used to control the output current of the voltage converter. In comparison with the existing control solutions of the voltage converter, the current reference value can be timely reduced when an output current of a voltage converter is overcurrent, so as to achieve a timely regulation of the voltage converter when the output current of the voltage converter is overcurrent.

In some embodiments of this disclosure, S1120 specifically comprises:
  obtaining an output current and the first current threshold, and outputting a first signal when the absolute value of the output current is greater than the absolute value of the first current threshold;
Reducing the current reference value in response to the first signal.

In some embodiments of this disclosure, S1130 specifically comprises:
  generating a regulation value of an output current according to the reduced current reference value and an output current;
  generating a control signal of a voltage converter according to the regulation value.

In some embodiments of this disclosure, generating a control signal of a voltage converter according to the regulation value in S1130 specially comprises:
  a difference value determination subunit, which is used to determine a difference value between the reduced current reference value and an output current;
  a regulation value determination subunit, which is used to determine a regulation value according to a difference value.

In some embodiments of this disclosure, reducing the current reference value in response to a first signal in S1120 specifically comprises:

determining a current down-regulation value in response to a first signal;

obtaining the reduced current reference value after reducing the current down-regulation value from the current reference value.

Figure 12:
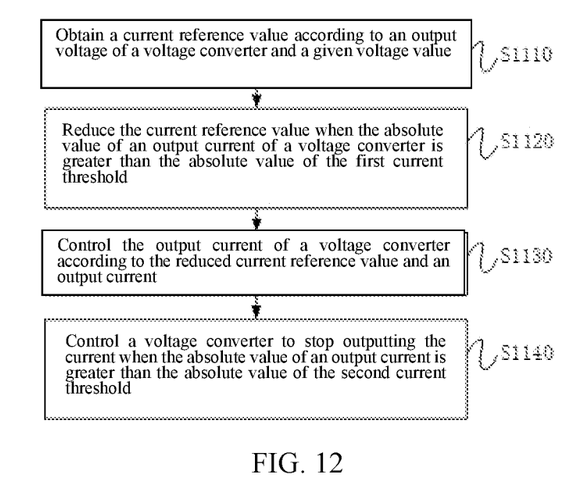
FIG. 12 is a flow schematic diagram for another control method of a voltage converter provided in the embodiments of this disclosure.

In some embodiments of this disclosure, FIG. 12 is a flow schematic diagram for another control method of a voltage converter provided in the embodiments of this disclosure. The difference between FIG. 12 and FIG. 11 is that after S1130, the control method of a voltage converter in FIG. 12 further comprises S1140.

S1140, controlling the voltage converter to stop outputting the current when the absolute value of an output current is greater than the absolute value of the second current threshold.

The absolute value of the second current threshold is greater than the absolute value of the first current threshold.

In some embodiments of this disclosure, S1140 specifically comprises:

obtaining an output current and the second current threshold, and outputting a control instruction used to control the voltage converter to stop outputting the current when the absolute value of the output current is greater than the absolute value of the second current threshold;

generating a control signal of the voltage converter in response to the control instruction.

In some embodiments of this disclosure, generating a control signal of the voltage converter in response to the control instruction in S1140 specifically comprises:

modulating the control signal into a low-level signal in response to the control instruction.

Other details of the control method for the voltage converter according to the embodiments of this disclosure are similar to those of the control device for the voltage converter described above in combination with the examples shown in FIG. 3 through FIG. 10, and can achieve their corresponding technical effect, which is not repeated here for the sake of simple description.

Figure 13:
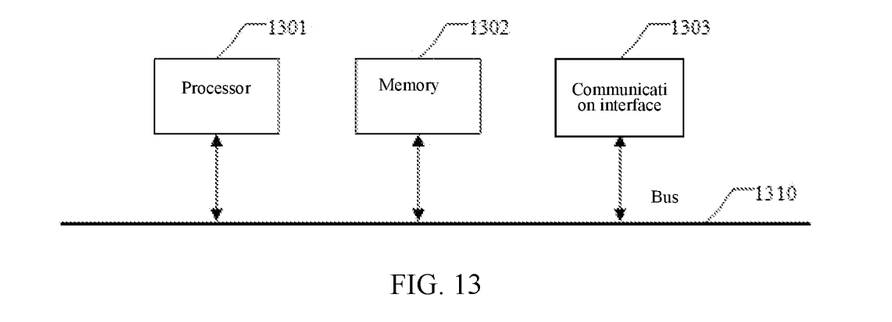
FIG. 13 is a hardware structural schematic diagram for a control device of a voltage converter provided in the embodiments of this disclosure.

FIG. 13 shows a hardware structural schematic diagram for a control device of a voltage converter provided in the embodiments of this disclosure.

The control device for a voltage converter may comprise a processor 1301 and a memory 1302 that stores computer program instructions.

Specifically, the processor 1301 may include a central processing unit (CPU) or an disclosure specific integrated circuit (ASIC), or can be configured into one or more integrated circuit(s) to implement the embodiments of this disclosure.

The memory 1302 may comprise a mass memory for data or instructions. For example but without limitation, the memory 1302 may comprise a hard disk drive (HDD), a floppy disk drive, a flash memory, an optical disk, a magneto-optical disk, a magnetic tape, or a universal serial bus (USB) drive or a combination of above two or more thereof. In some embodiments, the memory 1302 may comprise a removable or non-removable (or fixed) medium, or the memory 1302 is a non-volatile solid-state memory. In some embodiments, the memory 1302 may be either inside or outside the control device for the voltage converter.

In some embodiments, the memory 1302 may be a read only memory (ROM). In an example, the ROM may be a mask-programmed ROM, a programmable ROM (PROM), an erasable PROM (EPROM), an electrically erasable PROM (EEPROM), an electrically alterable ROM (EAROM), a flash memory, or a combination of above two or more thereof.

The memory 1302 may comprise a read-only memory (ROM), a random access memory (RAM), a disk storage medium device, an optical storage medium device, a flash memory device, an electrical, optical, or other physical/tangible memory storage device. Therefore, the memory usually comprises one or more tangible (non-transient) computer readable storage medium(s) (for example, a memory device) coded with software of computer executable instructions, and when such software is executed (for example, by one or more processors), the memory can execute the operation described in the method according to an aspect of this disclosure.

The processor 1301 reads and executes the computer program instructions stored in the memory 1302 to achieve the methods in the embodiments shown in FIG. 11 and FIG. 12 and to achieve the corresponding technical effects which can be realized by executing the methods in the embodiments shown in FIG. 11 and FIG. 12, which is not repeated here for the sake of simple description.

In an example, the control device for the voltage converter may further comprise a communication interface 1303 and a bus 1310. As shown in FIG. 13, the processor 1301, the memory 1302 and the communication interface 1303 are connected and communicate with each other through the bus 1310.

The communication interface 1303 is used to achieve the communication among modules, devices, units and/or equipment in the embodiments of this disclosure.

The bus 1310 comprises hardware, software, or both thereof, and couples the components of an online data flow billing device with each other. For example but without limitation, the bus may comprise an accelerated graphics port (AGP) or other graphics buses, an extended industry standard architecture (EISA) bus, a front side bus (FSB), a hyper transport (HT) interconnection, an industry standard architecture (ISA) bus, an InfiniBand interconnect, a low pin count (LPC) bus, a memory bus, a microchannel architecture (MCA) bus, a peripheral component interconnection (PCI) bus, a PCI-Express (PCI-X) bus, a serial advanced technology accessories (SATA) bus, a Video Electronics Standards Association local bus (VLB), other appropriate buses or a combination of above two or more thereof. When appropriate, the bus 1310 may comprise one or more buses. Although specific buses are described and shown in the embodiments of this disclosure, any suitable bus or interconnection is considered in this disclosure.

The control device for such voltage converter can execute the control method for the voltage converter in the embodiments of this disclosure, so as to achieve the control method and the device for the voltage converter described in combination with FIG. 3 through FIG. 12.

In addition, the embodiments of this disclosure can provide a computer storage medium to achieve the control method for the voltage converter in combination with the above embodiments. The computer storage medium is stored with computer program instructions; when the computer program instructions are executed by the processor, any control method for the voltage converter in the above embodiments can be achieved.

To be clear, this disclosure is not limited to the specific configuration and processing described above and shown in the figures. For brevity, a detailed description of the known methods has been omitted here. Several concrete steps are described and shown as examples in the above embodiments. However, the methodological process of this disclosure is not limited to the specific steps as described and shown, and a person of skill in the art can, after understanding the spirit of this disclosure, make various changes, modifications and additions, or change the order among the steps.

The functional blocks shown in the structural block diagram above can be implemented in hardware, software, firmware or a combination thereof. When implemented in hardware, this can be, for example, an electronic circuit, an disclosure specific integrated circuit (ASIC), an appropriate firmware, a plug-in, or a functional card. When implemented in software, the elements of this disclosure are the program or code segment that is used to execute the required task. A program or a code segment can be stored in a machine-readable medium or transmitted over a transmission medium or communication link by a data signal carried on a carrier. The "machine-readable medium" may comprise any medium capable of storing or transmitting the information. Examples of machine-readable medium comprise an electronic circuit, a semiconductor memory device, a ROM, a flash memory, an erasable ROM (EROM), a floppy disk, a CD-ROM, an optical disk, a hard disk, an optical fiber medium, a radio frequency (RF) link and so on. The code segment can be downloaded over computer networks such as the Internet and intranets.

Please note that the exemplary embodiments referred to in this disclosure describe some methods or systems based on a series of steps or devices. However, this disclosure is not limited to the order of the above steps, that is, the steps may be executed either in the order referred to in the embodiments or in a different order from the embodiments, or several steps may be executed simultaneously.

Aspects of this disclosure are described above in terms of flow charts and/or block diagrams of methods, devices, equipment and computer program products according to the embodiments of this disclosure. Understandably, each box in the flow chart and/or block diagram and the combination of the boxes in the flow chart and/or block diagram can be implemented by computer program instructions. These computer program instructions can be provided to a general-purpose computer, a special-purpose computer or a processor for other programmable data processing devices to produce a machine, so that these instructions executed by the computer or the processor for other programmable data processing devices can trigger the implementation of designated functions/actions in the one or more boxes of the flow chart and/or block diagram. Such a processor may be but is not limited to a general-purpose processor, a special-purpose processor, a special-disclosure processor, or a field programmable logic circuit. Further understandably, each box in the block diagram and/or flow chart and the combination of boxes in the block diagram and/or flow chart may further either be implemented by dedicated hardware executing a designated function or action, or by a combination of dedicated hardware and computer instructions.

The above is simply the specific implementation of this disclosure, and a person of skill in the art can clearly understand it. For the convenience and brevity of description, the specific working process of the systems, modules and units described above can refer to the corresponding process in the embodiments of the preceding methods, which is not repeated here. Understandably, the scope of this disclosure is not limited to the above, and any person of skill in the art can easily think of various equivalent modifications or substitutions in the technical scope disclosed in this disclosure, while such modifications or substitutions are covered by the scope of this disclosure.

What is claimed is:

1. A control device for a voltage converter, comprising:
   a first control module configured to obtain a current reference value according to an output voltage of the voltage converter and a given voltage value;
   a current modulation module configured to reduce the current reference value when an absolute value of an output current of the voltage converter is greater than an absolute value of a first current threshold; and
   a second control module configured to control the output current of the voltage converter according to the reduced current reference value and the output current and, wherein the current modulation module comprises:
   a first comparator unit configured to obtain the output current and the first current threshold, and to output a first signal when the absolute value of the output current is greater than the absolute value of the first current threshold;
   a current modulation unit configured to reduce the current reference value in response to the first signal.

2. The control device for the voltage converter according to claim 1, wherein the first comparator unit comprises a first comparator subsystem (CMPSS).

3. The control device for the voltage converter according to claim 1, wherein the current modulation unit comprises:
   a processing subunit configured to determine a current down-regulation value in response to the first signal;
   a current modulation subunit configured to reduce the current down-regulation value by the current reference value to obtain the reduced current reference value.

4. The control device for the voltage converter according to claim 1, wherein the second control module comprises:
   a control unit configured to generate a regulation value of the output current according to the reduced current reference value and the output current;
   a first signal generation unit configured to generate a control signal of the voltage converter according to the regulation value, to control the output current of the voltage converter by the control signal.

5. The control device for the voltage converter according to claim 4, wherein the first signal generation unit comprises a first enhanced pulse width modulation (ePWM) unit.

6. The control device for the voltage converter according to claim 4, wherein the control unit comprises:
   a difference value determination subunit configured to determine a difference value between the reduced current reference value and the output current; and
   a regulation value determination subunit configured to determine the regulation value according to the difference value.

7. The control device for the voltage converter according to claim 1, wherein the control device further comprises:
   a third control module configured to control the voltage converter to stop outputting current when the absolute value of the output current is greater than an absolute value of the second current threshold,
   wherein the absolute value of the second current threshold is greater than the absolute value of the first current threshold.

8. The control device for the voltage converter according to claim 7, wherein the third control module comprises:
   a second comparator unit configured to obtain the output current and the second current threshold, and to output a control instruction when the absolute value of the output current is greater than the absolute value of the second current threshold, and the control instruction being configured to control the voltage converter to stop outputting current; and a second signal generation unit configured to generate the control signal of the voltage converter in response to the control instruction.

9. The control device for the voltage converter according to claim 8, wherein the second comparator unit comprises a second CMPSS.

10. The control device for the voltage converter according to claim 8, wherein the second signal generation unit comprises:
an event trip subunit configured to modulate the control signal into a low-level signal in response to the control instruction.

11. The control device for the voltage converter according to claim 8, wherein the second signal generation unit comprises a second ePWM unit.

12. The control device for the voltage converter according to claim 1, wherein one end of the voltage converter is connected with a battery, and the other end of the voltage converter is connected with a grid or an AC load.

13. A voltage control system, comprising:
the control device for a voltage converter according to claim 1; and
the voltage converter.

14. A control method for a voltage converter, comprising:
obtaining a current reference value according to an output voltage of the voltage converter and a given voltage value;
reducing the current reference value when an absolute value of an output current of the voltage converter is greater than an absolute value of a first current threshold;
controlling the output current of the voltage converter according to the reduced current reference value and the output current and, wherein reducing the current reference value when an absolute value of an output current of the voltage converter is greater than an absolute value of the first current threshold further comprises:
obtaining the output current and the first current threshold, and outputting a first signal when the absolute value of the output current is greater than the absolute value of the first current threshold;
determining a current down-regulation value in response to the first signal;
reducing the current down-regulation value by the current reference value to obtain the reduced current reference value.

15. The method according to claim 14, wherein controlling the output current of the voltage converter according to the reduced current reference value and the output current further comprises:
generating a down-regulation value of the output current according to the reduced current reference value and the output current;
generating a control signal of the voltage converter according to the regulation value so as to control the output current of the voltage converter by the control signal.

16. The method according to claim 14, wherein after obtaining a current reference value according to an output voltage of the voltage converter and a given voltage value, the method further comprises:
controlling the voltage converter to stop outputting current when the absolute value of the output current is greater than the absolute value of the second current threshold, wherein an absolute value of the second current threshold is greater than the absolute value of the first current threshold.

17. A control device for a voltage converter, comprising a processor and a non-transitory memory storing with computer program instructions, wherein the processor implements the control method for the voltage converter according to claim 14 by reading and executing the computer program instructions stored in the memory.

18. A non-transitory computer storage medium on which computer program instructions are stored on the computer storage medium, wherein the computer program instructions, when being executed by a processor, implements the control method for the voltage converter according to claim 14.

* * * * *